(12) United States Patent
Cramer

(10) Patent No.: US 7,690,222 B2
(45) Date of Patent: Apr. 6, 2010

(54) GLASS GOB DISTRIBUTION

(75) Inventor: Jeffrey W. Cramer, Liberty Center, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 571 days.

(21) Appl. No.: 11/498,211

(22) Filed: Aug. 2, 2006

(65) Prior Publication Data
US 2008/0028796 A1 Feb. 7, 2008

(51) Int. Cl.
C03B 7/14 (2006.01)
C03B 7/00 (2006.01)
C03B 9/16 (2006.01)
C03B 9/20 (2006.01)
C03B 11/00 (2006.01)

(52) U.S. Cl. .............................. 65/304; 65/207; 65/221; 65/225; 65/303

(58) Field of Classification Search ........... 65/160–166, 65/174–180, 207–226, 324–334, 303–304
See application file for complete search history.

(56) References Cited

U.S. PATENT DOCUMENTS

| 3,775,083 | A | * | 11/1973 | Nebelung et al. ............. 65/225 |
| 4,529,431 | A | | 7/1985 | Mumford |
| 4,599,101 | A | | 7/1986 | Douglas et al. |
| 4,687,502 | A | | 8/1987 | Douglas et al. |
| 4,722,748 | A | * | 2/1988 | Duga ........................... 65/225 |
| 4,723,977 | A | * | 2/1988 | Grant et al. ................. 65/29.11 |
| 4,723,981 | A | * | 2/1988 | Duga ........................... 65/225 |
| 4,723,982 | A | * | 2/1988 | Duga ........................... 65/225 |
| 4,740,227 | A | * | 4/1988 | Bratton et al. ................ 65/164 |
| 4,756,736 | A | * | 7/1988 | Fenton ......................... 65/225 |
| 5,135,559 | A | | 8/1992 | Sasso et al. |
| 5,405,424 | A | * | 4/1995 | Steffan et al. ................. 65/158 |
| 5,458,668 | A | * | 10/1995 | Shoji ........................... 65/222 |
| 5,697,995 | A | * | 12/1997 | Leidy et al. ................. 65/29.12 |
| 5,746,798 | A | * | 5/1998 | Menzie ...................... 65/29.12 |
| 5,895,514 | A | * | 4/1999 | DiFrank ...................... 65/304 |
| 6,548,970 | B1 | * | 4/2003 | Leidy et al. .................. 318/38 |
| 2005/0022559 | A1 | * | 2/2005 | Hermening et al. ........... 65/304 |

* cited by examiner

Primary Examiner—Steven P Griffin
Assistant Examiner—Jodi Cohen

(57) ABSTRACT

A glass gob distributor for delivering gobs of molten glass to sections of a glassware forming machine, in accordance with exemplary embodiments of the present disclosure, includes at least one electric motor, a ball screw coupled to the electric motor and a carriage slidable on a carriage shaft and coupled to the ball screw. At least one gear rack is coupled to the carriage and at least one scoop is coupled to the gear rack for rotation around a scoop axis as a function of linear motion of the gear rack and the carriage. A pair of slides are slidably disposed on opposite sides of the carriage and are disconnected from the carriage. A pair of fluid cylinders are disposed adjacent to the slides. The fluid cylinders are responsive to an absence of power at the electric motor for pushing the centering slides toward each other to abut and slidably position the carriage on the carriage shaft, the gear rack and the at least one scoop at a home position. In exemplary embodiments of the disclosure, a plurality of scoops are coupled either to individual associated electric motors through associated gear racks, carriages and ball screws, or are coupled to a single electric motor through one or more gear racks, a single carriage and a single ball screw.

7 Claims, 13 Drawing Sheets

GLASS GOB DISTRIBUTION

The present disclosure relates to a glass gob distributor for an individual section glassware forming machine.

BACKGROUND AND SUMMARY OF THE DISCLOSURE

The science of glass container manufacture currently is served by the so-called individual section machine. Such a machine includes a plurality of separate or individual manufacturing sections, each of which has a multiplicity of operating mechanisms for converting one or more charges or gobs of molten glass into hollow glass containers and transferring the containers through successive stages of the machine section. In general, an individual section machine system includes a source of glass for generating one or more streams of molten glass, a shear mechanism for cutting the stream or streams of molten glass into individual gobs, and a gob distributor for distributing the individual gobs among the machine sections. Each machine section includes one or more blank molds in which a glass gob is initially formed in a blowing or pressing operation, one or more transfer mechanisms for transferring the blanks to blow molds in which the containers are blown to final form, a second transfer mechanism for removing the formed containers onto a deadplate, and a third transfer mechanism for transferring the molded containers from the deadplate onto a machine conveyor. A general object of the present disclosure is to provide a glass gob distributor for an individual section machine glassware forming system.

A glass gob distributor for delivering gobs of molten glass to sections of a glassware forming machine, in accordance with exemplary embodiments of the present disclosure, includes at least one electric motor, a ball screw coupled to the electric motor, and a carriage slidable on a carriage shaft and coupled to the ball screw. At least one gear rack is coupled to the carriage and at least one scoop is coupled to the gear rack for rotation around a scoop axis as a function of linear motion of the gear rack and the carriage. A pair of slides are slidably disposed on opposite sides of the carriage and are disconnected from the carriage. A pair of fluid cylinders are disposed adjacent to the centering slides. The fluid cylinders are responsive to an absence of power at the electric motor for pushing the slides toward each other to abut and slidably position the carriage on the carriage shaft, the gear rack and the at least one scoop at a home position. In exemplary embodiments of the disclosure, a plurality of scoops are coupled either to individual associated electric motors through associated gear racks, carriages and ball screws, or are coupled to a single electric motor through one or more gear racks, a single carriage and a single ball screw.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
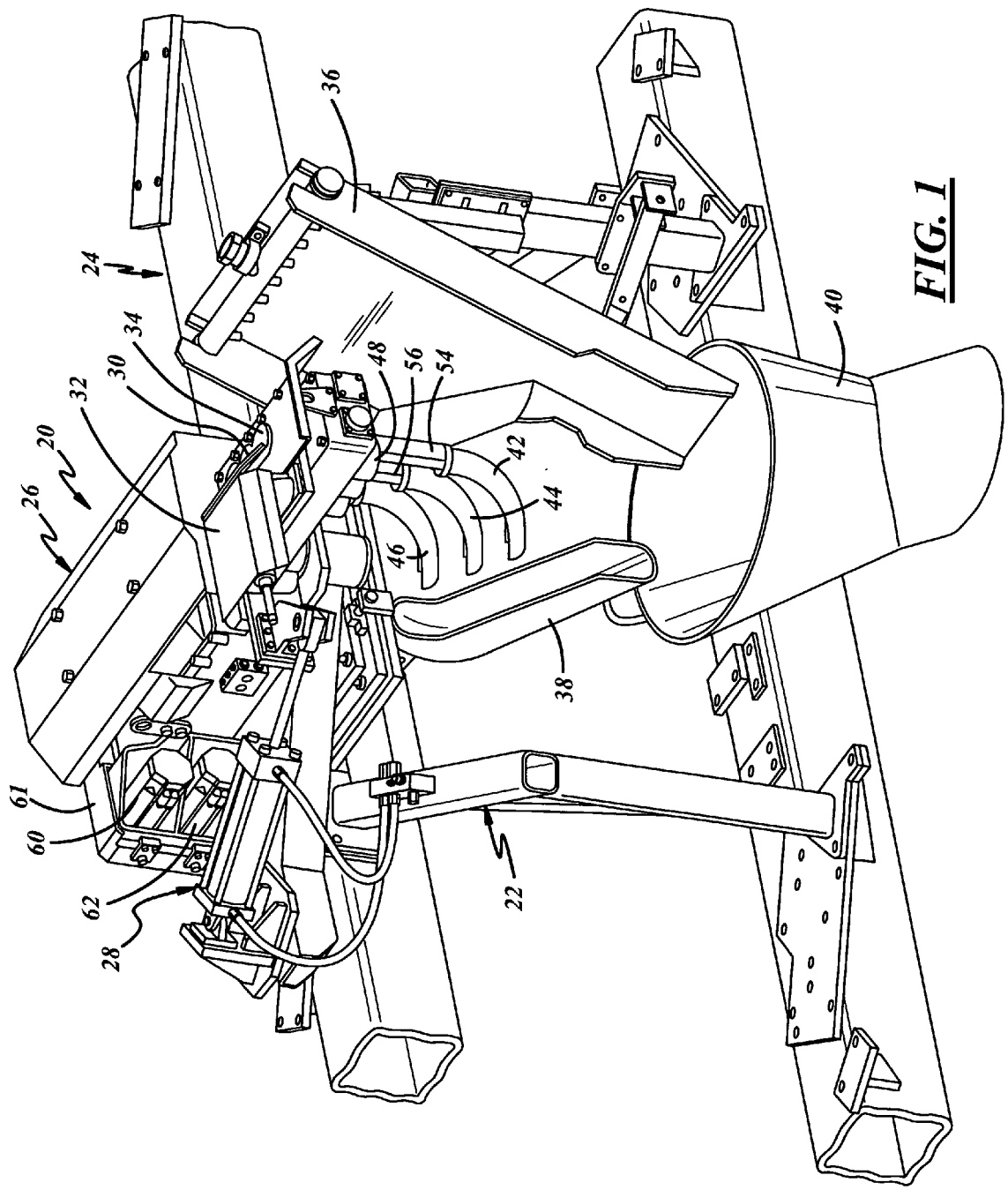
FIG. 1 is a perspective view of a glass gob distributor in accordance with an exemplary embodiment of the present disclosure mounted on a glassware forming machine frame.
Figure 2:
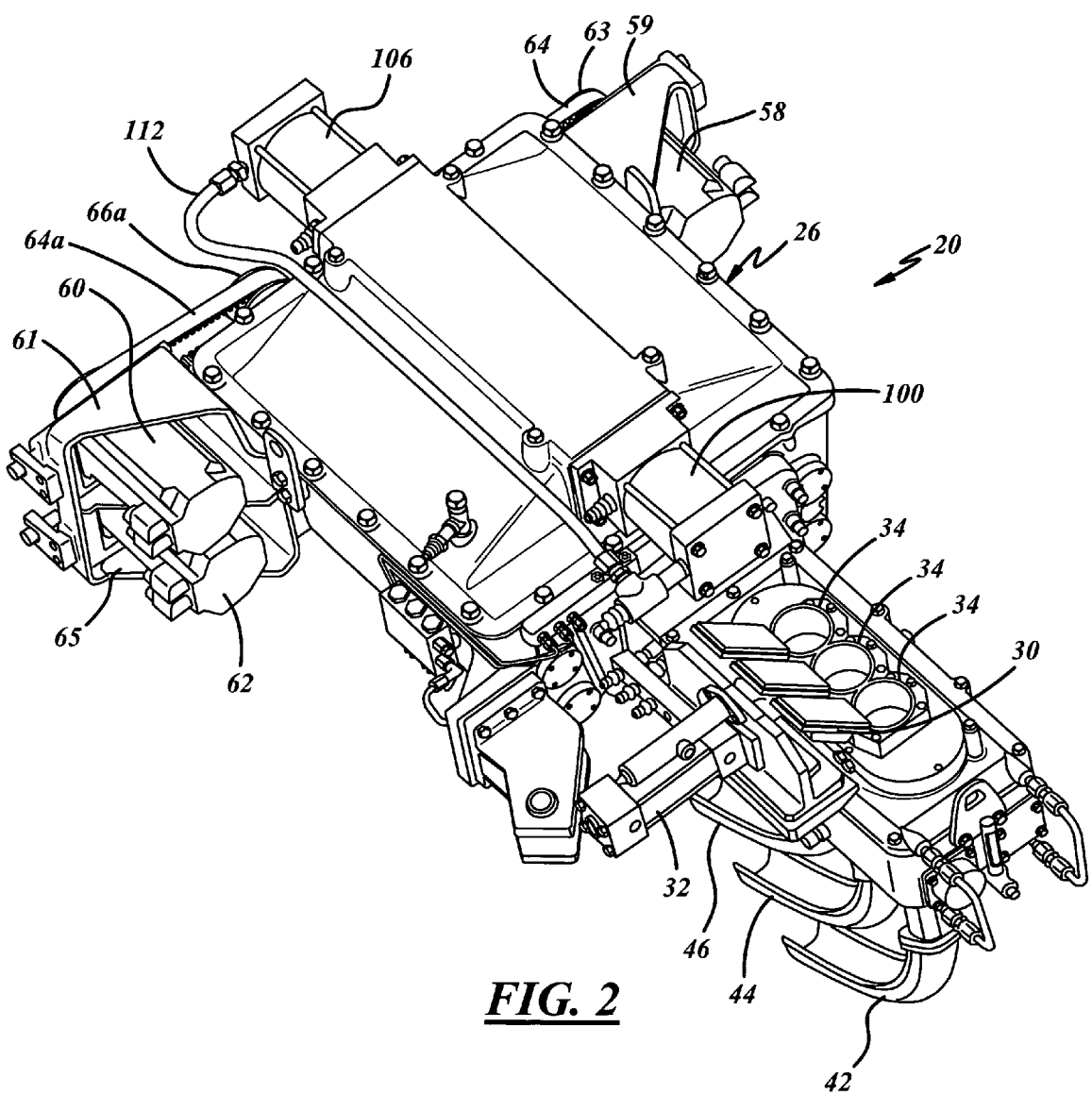
FIG. 2 is a top perspective view of the gob distributor illustrated in FIG. 1.
Figure 3:
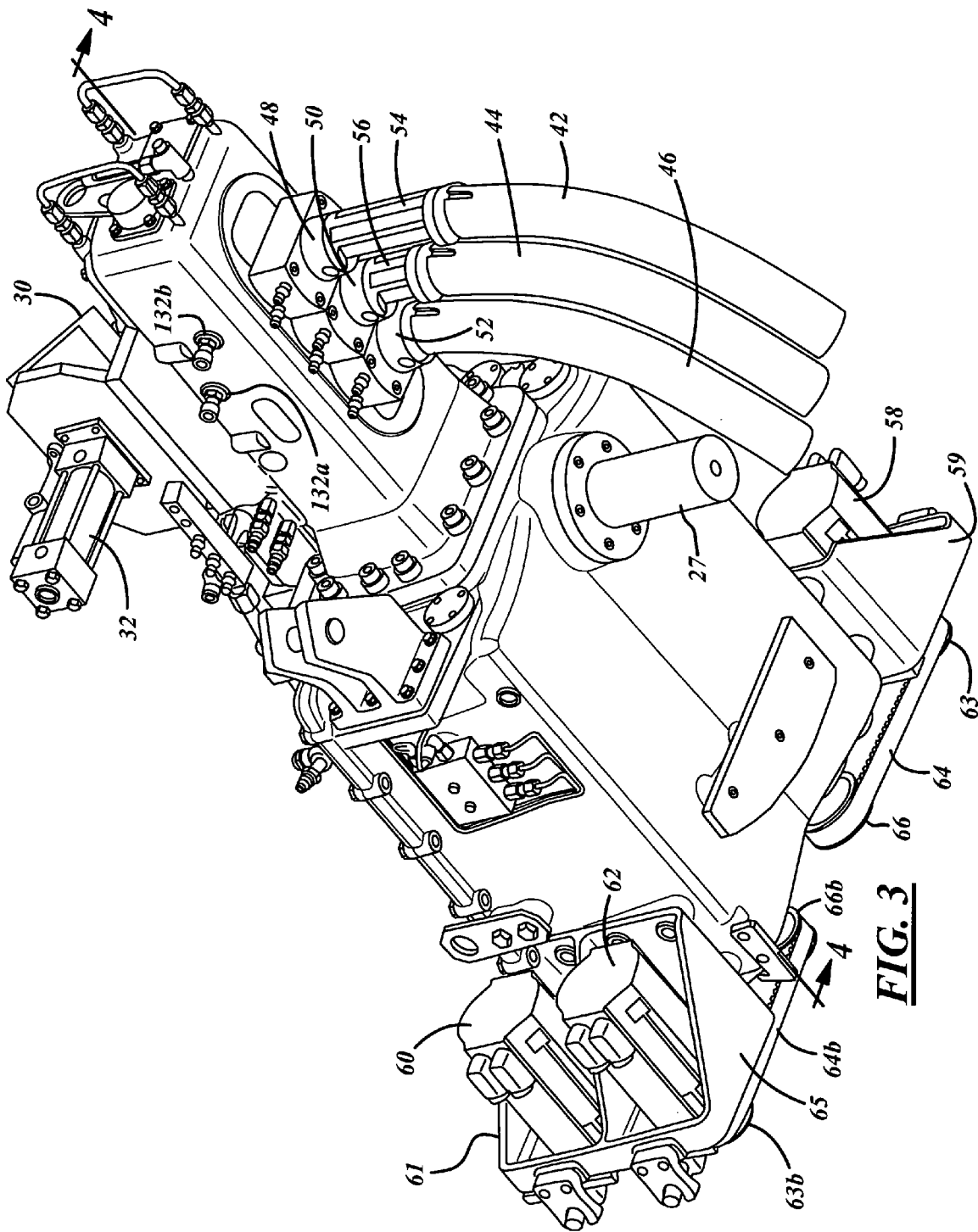
FIG. 3 is a bottom perspective view of the glass gob distributor illustrated in FIGS. 1 and 2.

FIGS. 1-3 illustrate a gob distributor 20 in accordance with one exemplary embodiment of the present disclosure mounted by a frame 22 on the overhead structure 24 of an individual section glassware forming machine. Gob distributor 20 includes a housing 26 that may be pivotally mounted on structure 24 by a post 27 (FIG. 3) and coupled to a fluid cylinder 28 (FIGS. 1 and 2) for retracting gob distributor 26 from the operating position illustrated in FIGS. 1-3 for purposes of maintenance or repair, for example. A deflector 30 is coupled to one or more fluid actuators 32 for movement over the upper inlet ends of funnels 34 for selectively deflecting onto a main reject chute 36 molten glass gobs falling from an overhead shear mechanism. A secondary reject chute 38 selectively receives molten glass gobs at the home positions of the gob scoops illustrated in FIGS. 1-3. Reject chutes 36,38 direct rejected glass gobs into a cullet chute 40.

The embodiments illustrated in the application drawings are adapted to distribute three simultaneously falling glass gobs among troughs leading to individual machine sections, each of which includes three blank molds, three blow molds, etc. In other words, the gob distributor of the present disclosure is described in conjunction with a so-called triple-gob machine system. However, it will be recognized that the principles of the present disclosure apply equally as well to double-gob machine systems, quad machine systems, etc. Thus, there are three funnels 34 that are aligned with associated gob scoops 42, 44, 46. Each scoop 42, 44, 46 is suspended from an associated hollow spindle 48, 50, 52, with scoops 42, 44 being suspended from spindles 48, 50 by associated extensions 54, 56 so that the lower portions of the scoops overlie but are spaced from each other. Each hollow spindle has an associated array of external gear teeth 48$a$, 50$a$, 52$a$, with at least two of the arrays being at different elevations (e.g., array 50$a$ at a different elevation from arrays 48$a$, 52$a$). Each hollow spindle 48, 50, 52 underlies and is aligned with an associated funnel 34 so that molten glass gobs can fall through funnels 34 and spindles 48-52 onto scoops 42-46, which direct the molten glass gobs to associated troughs as will be described. Funnels 34 may include provision for air-assisted acceleration of the individual molten glass gobs so that the gobs arrive simultaneously at the blank molds of each machine section in sequence as disclosed for example in U.S. Pat. No. 5,746,798.

In gob distributor 20 of FIGS. 1-10, motion at each scoop 42, 44, 46 is controlled by an associated electric motor, preferably an electric servo motor. A first electric motor 58 is carried by a frame 59 on housing 26 and operatively coupled to spindle 52 and scoop 46. A second electric motor 60 likewise is mounted on a frame 61 on housing 26 and operatively coupled to spindle 50 and scoop 44, and a third electric motor 62 is mounted on a frame 65 on housing 26 and operatively coupled to spindle 48 and scoop 42. In the particular embodiment shown, frames 61 and 65 are a single unit, and all of the frames 59, 61, 65 are mounted on the base of housing 26 with motor 58 and motors 60, 62 on laterally opposed sides of the housing. The coupling between first motor 58 and spindle 52 will be described in detail, the couplings between the other motors and the associated spindles being substantially identical.

Motor 58 has an output shaft that is connected by a pulley 63 and a drive belt 64 to a pulley 66 on a shaft 68. Shaft 68 extends into housing 26 and is coupled by a ball screw 70 to a ball nut 72 carried by a carriage 74. Carriage 74 is freely slidable along a carriage shaft 76 that is parallel to ball screw 70, as well as parallel to the axis of rotation of the output of motor 58. A yoke 78 is connected to carriage 74 by a yoke mounting block 80. A linear gear rack 82 extends from yoke 78 so that gear rack 82 moves, in a direction parallel to the axes of ball screw 70 and carriage shaft 76, as a function of motion of ball nut 72 along ball screw 70. Gear rack 82 has gear teeth 84 that are operatively coupled to the external teeth 52a (FIG. 6) of spindle 52. Thus, rotation at pulley 63 at the output of motor 58 rotates shaft 68 through drive belt 64 and pulley 66, which moves ball nut 72, carriage 74, yoke 78 and gear rack 82 linearly within housing 26, which in turn rotates spindle 52 and scoop 46 around the axis (preferably vertical) of spindle 52. Motors 60, 62 likewise are coupled to spindles 50, 48 and scoops 44, 42, with the associated drive belts, pulleys, ball screws, etc. being indicated by correspondingly identical reference numerals in FIGS. 7-10 followed by the respective suffixes "a" and "b." Thus, in short, motor 58 is coupled to spindle 52 by a ball-screw/gear-rack drive 85 that includes ball screw 70, ball nut 72, carriage 74 on shaft 76, yoke 78 on yoke mounting block 80 and gear rack 82 having gear teeth 84 that engage teeth 52a on spindle 52. Motor 60 is coupled to spindle 50 by a ball-screw/gear-rack 85a that includes a pulley 63a, a belt 64a, a pulley 66a, a shaft 68a, a ball screw 70a, a ball nut 72a, a carriage 74a on a shaft 76a, a yoke 78a, a yoke mounting block 80a and a gear rack 82a with teeth 84a engaged with teeth 50a on spindle 50. Motor 62 is coupled to spindle 48 by a ball-screw/gear-rack drive 85b that includes pulley a 63b, a belt 64b, a pulley 66b, a shaft 68b, a ball screw 70b, a ball nut 72b, a carriage 74b on a shaft 76b, a yoke 78b, a yoke mounting block 80b and a gear rack 82b with teeth 84b engaged with teeth 48a on spindle 48.

Figure 4:
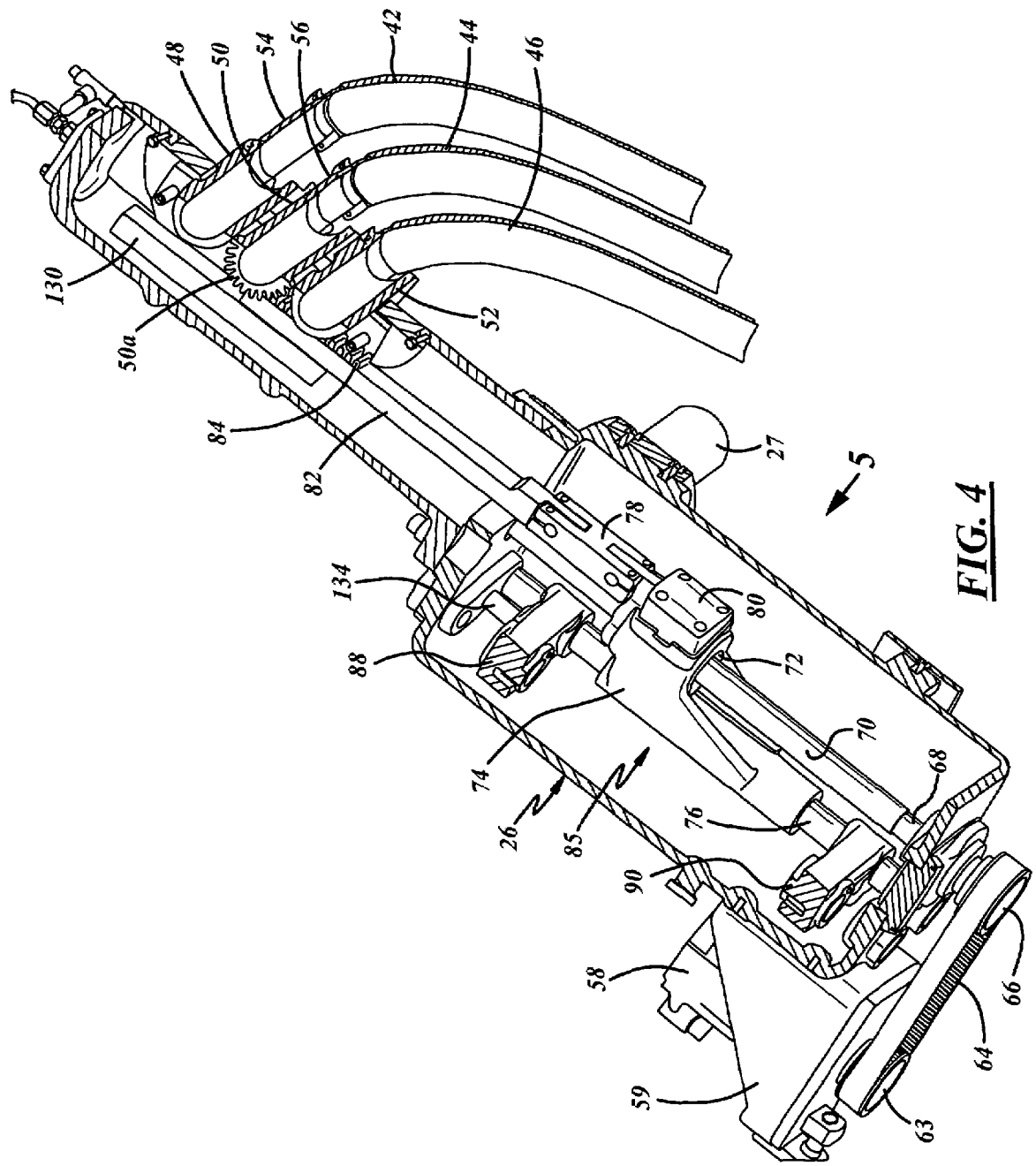
FIG. 4 is a partially sectioned perspective view of the glass gob distributor in FIGS. 1-3 taken substantially along the line 4-4 in FIG. 3.
Figure 5:
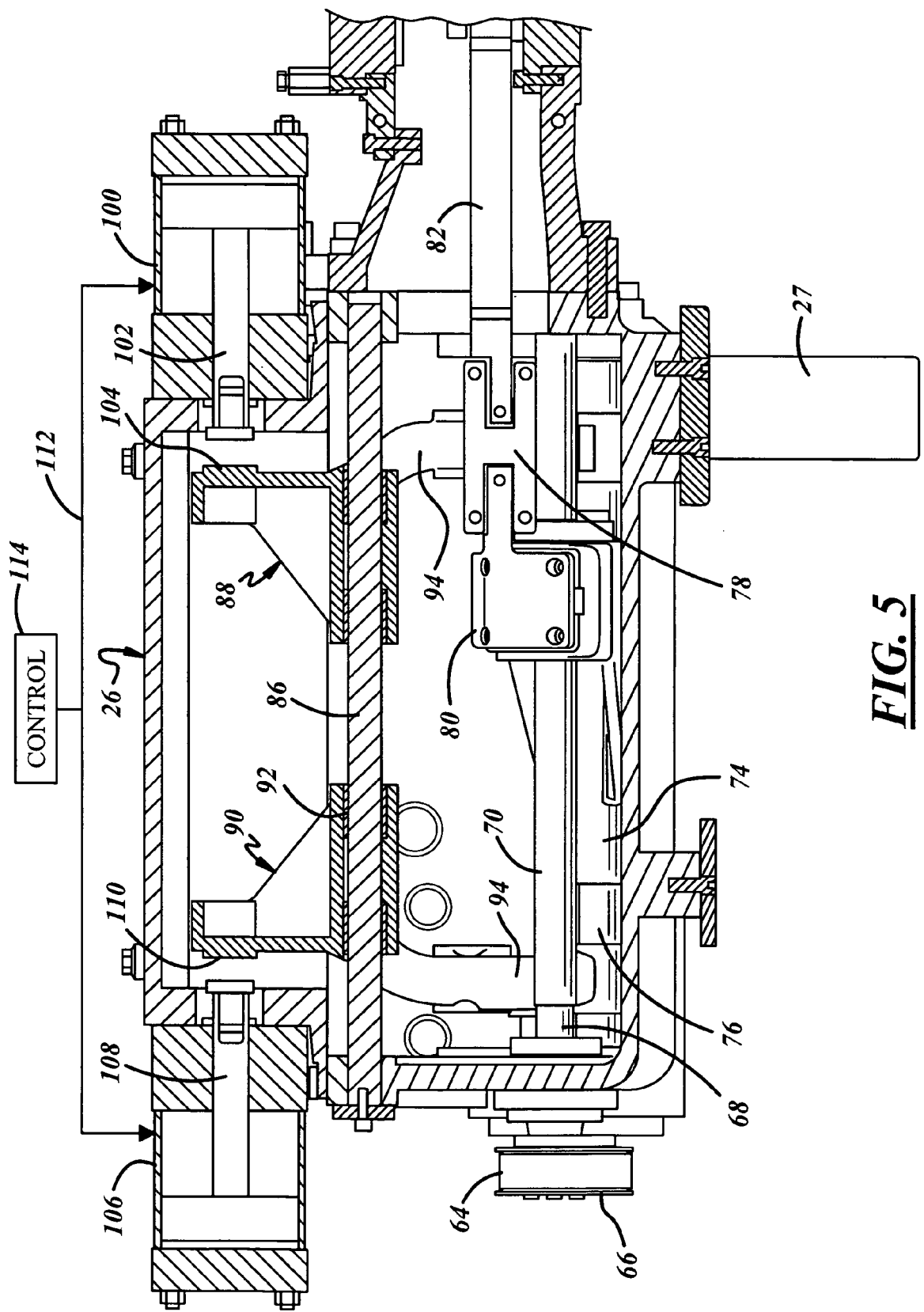
FIG. 5 is a fragmentary sectional view of the gob distributor in FIGS. 1-4 taken from the direction 5 in FIG. 4.

Referring now to FIGS. 2 and 4-6, a shaft 86 is stationarily disposed within housing 26. A pair of slides 88, 90 are freely slidably mounted on shaft 86, such as by sleeve bearings 92. Each slide 88, 90 has laterally oppositely extending arms 94, 96. Arms 94, 96 of slides 88, 90 preferably have clearance openings that move along carriage shaft 76 on opposed sides of carriage 74, as best seen in FIG. 4. Likewise, arms 96 of slides 88, 90 preferably have clearance openings that move along the other pair of carriage shafts 76a, 76b. As previously noted, slides 88, 90 are freely slidable on shafts 86 and 76, 76a, 76b. Thus, back and forth motions of carriages 74, 74a, 74b on carriage shafts 76, 76a, 76b normally push slides 88, 90 to widely spaced apart positions. Stops 134 (FIG. 4) may be provided on housing 26 to prevent slides 88, 90 from hitting the housing. A first fluid cylinder 100 is mounted on housing 26 and has an actuator shaft 102 positioned to engage an opposing abutment pad 104 on slide 88. Likewise, a second fluid cylinder 106 is carried by housing 26 and has an actuator shaft 108 disposed to engage an opposing abutment pad 110 on slide 90. Fluid cylinders 100, 106 are interconnected by one or more fluid lines 112 (FIGS. 2 and 5), which in turn are connected to a fluid control 114 (FIG. 5) for actuating fluid cylinders 100,106 substantially simultaneously so that actuator shafts 102,108 engage abutment pads 104,110 substantially simultaneously. Slides 88, 90 thus are urged toward each other so as to move and capture carriages 74, 74a, 74b at home positions for all carriages, which in turn position scoops 42, 44, 46 at the home positions illustrated in FIGS. 1-4. This automatic operation may take place when electrical power is lost or removed from the scoop drive motors or when machine operation is terminated, for example. The home positions of carriages 74, 74a, 74b and scoops 42, 44, 46 preferably are substantially centered in the overall range of motion of each component and preferably align the scoops with secondary reject chute 38, although any home positions can be employed.

Figure 6:
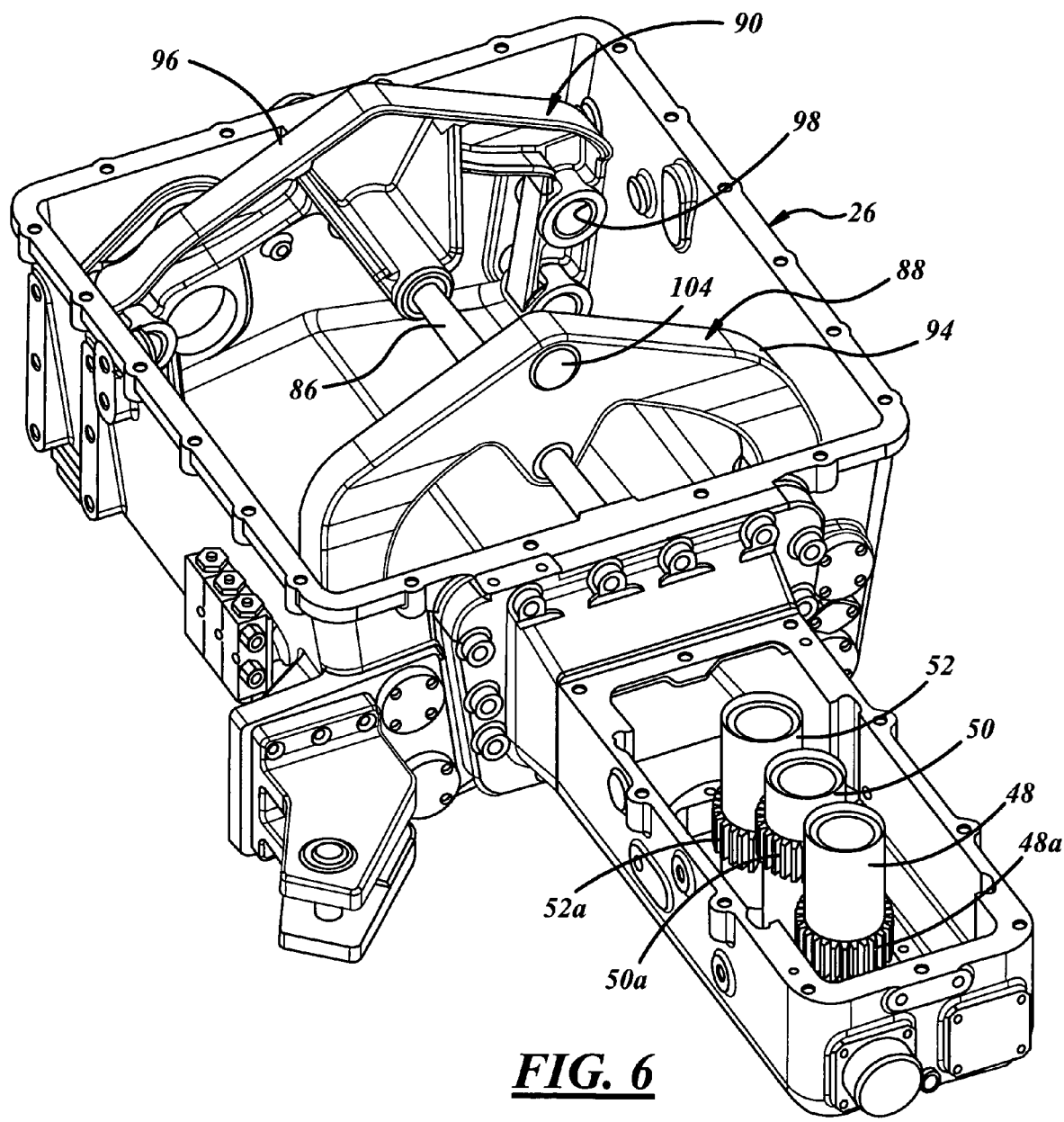
FIG. 6 is a top perspective view of a subassembly in the gob distributor of FIGS. 1-5.
Figure 7:
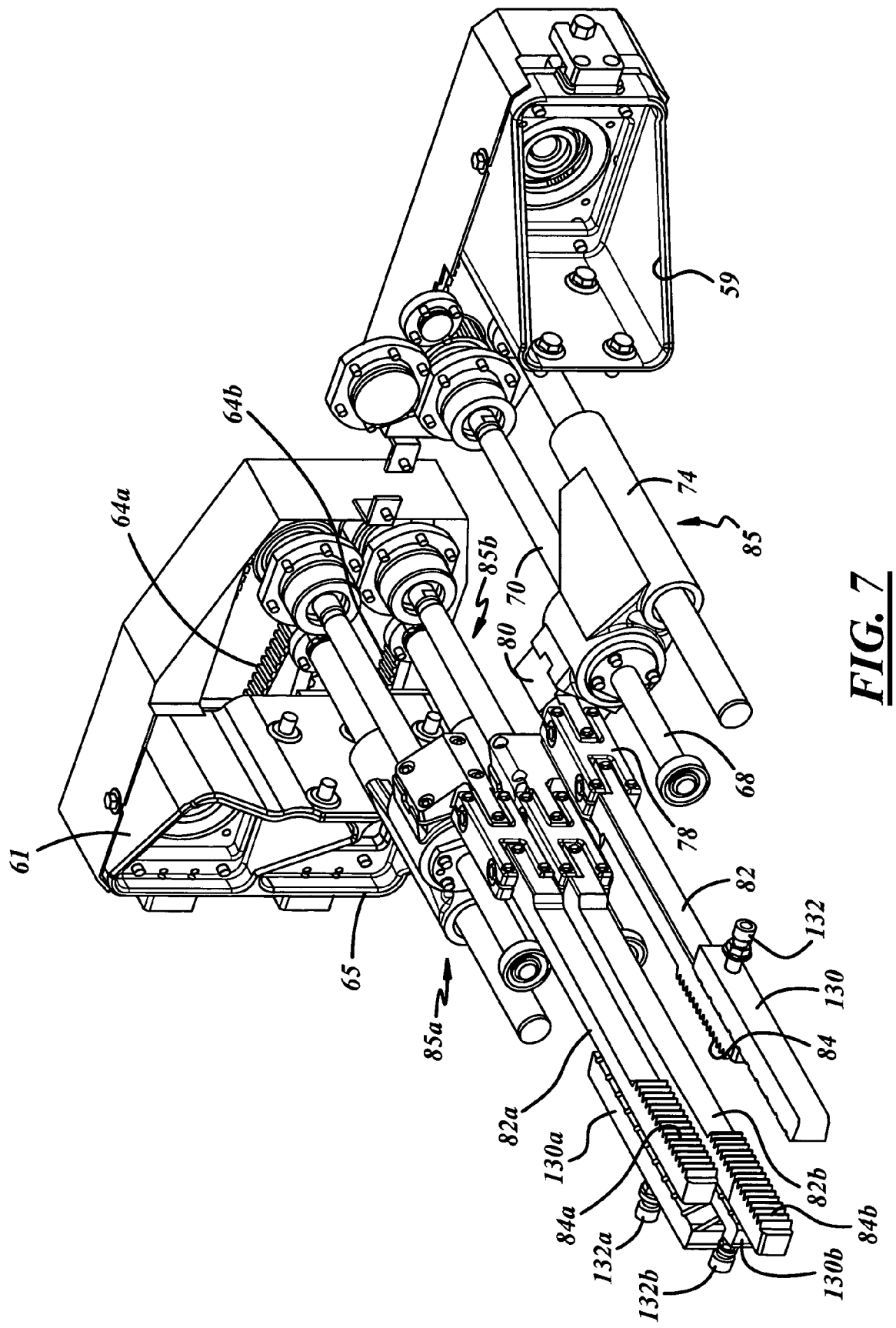
FIG. 7 is a front perspective view of a portion of the gob distributor in FIGS. 1-5.
Figure 8:
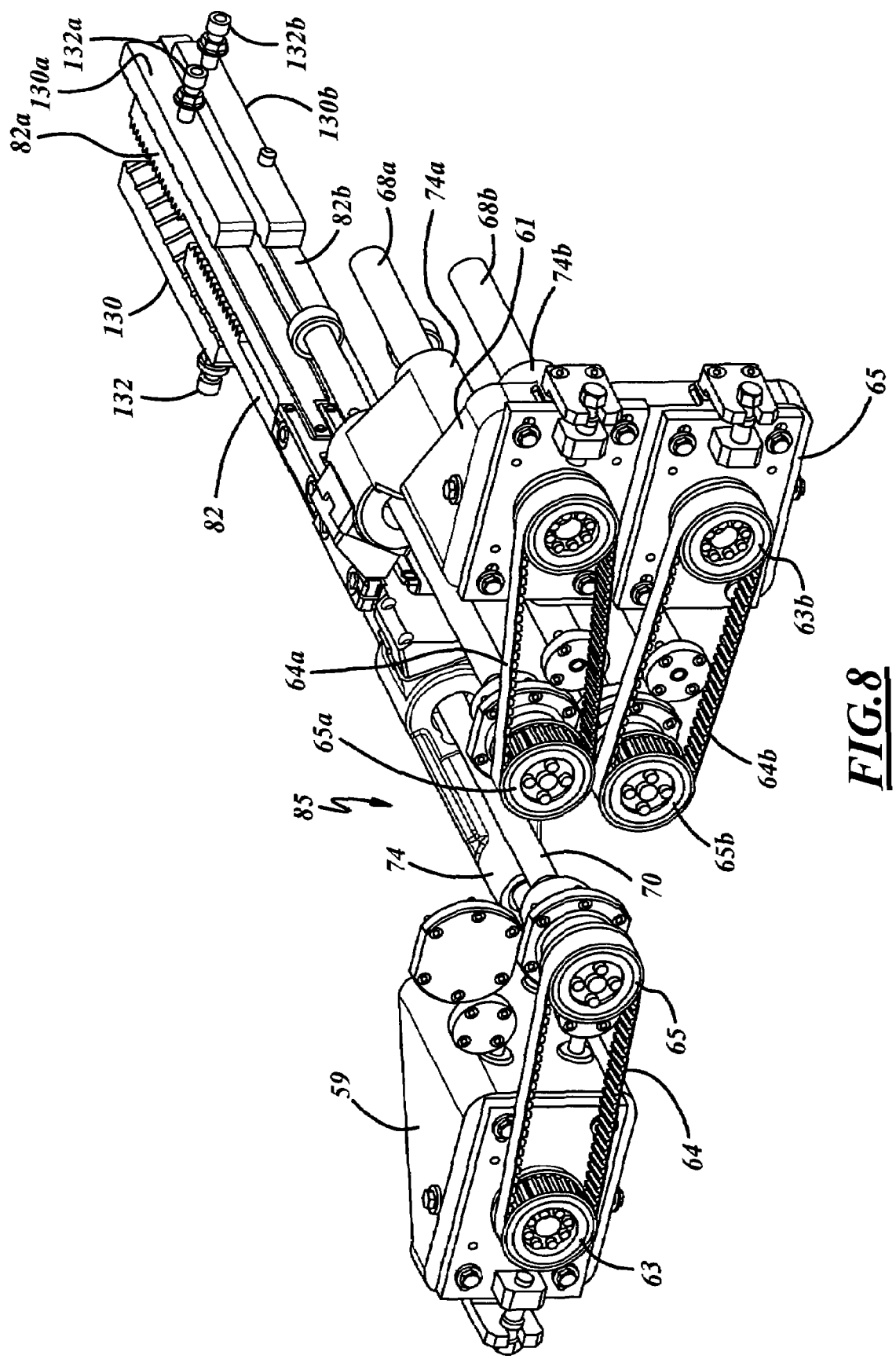
FIG. 8 is a rear perspective view of the portion of the gob distributor illustrated in FIG. 7.
Figure 9:
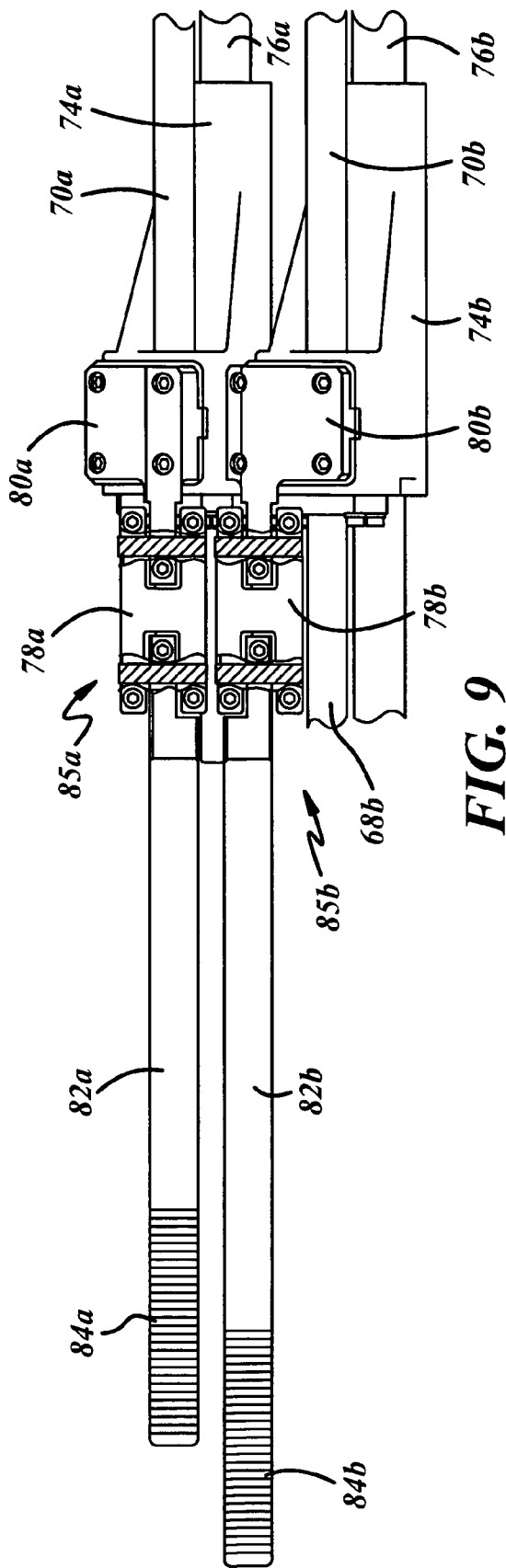
FIGS. 9 and 10 are fragmentary elevational views of portions of the gob distributor illustrated in FIGS. 7 and 8.
Figure 10:
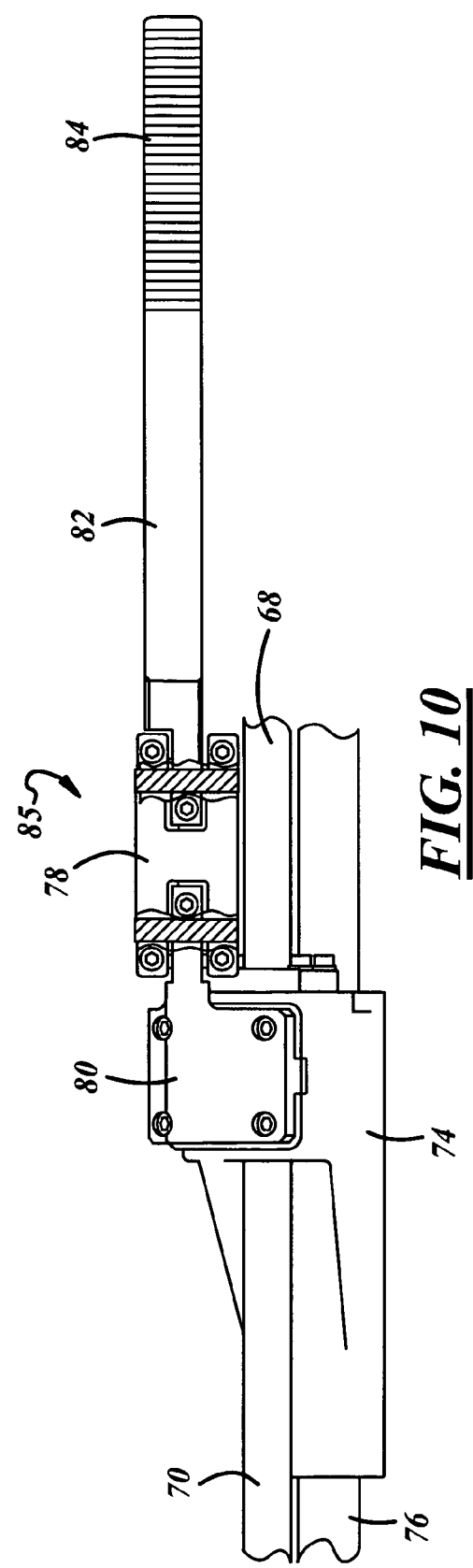
Figure 11:
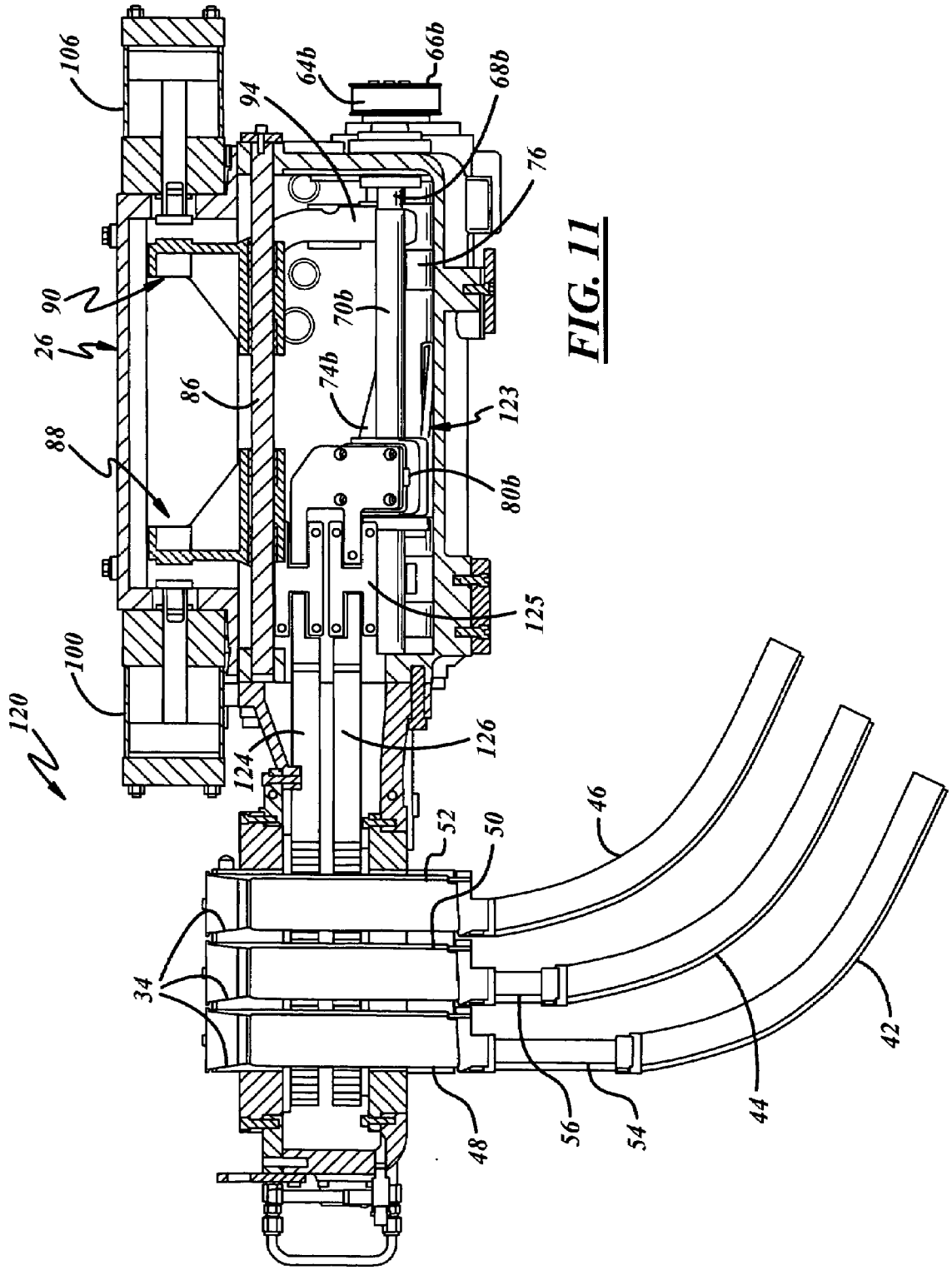
FIG. 11 is a sectional view similar to those of FIGS. 4 and 5 but illustrating a second exemplary embodiment of the present disclosure.
Figure 12:
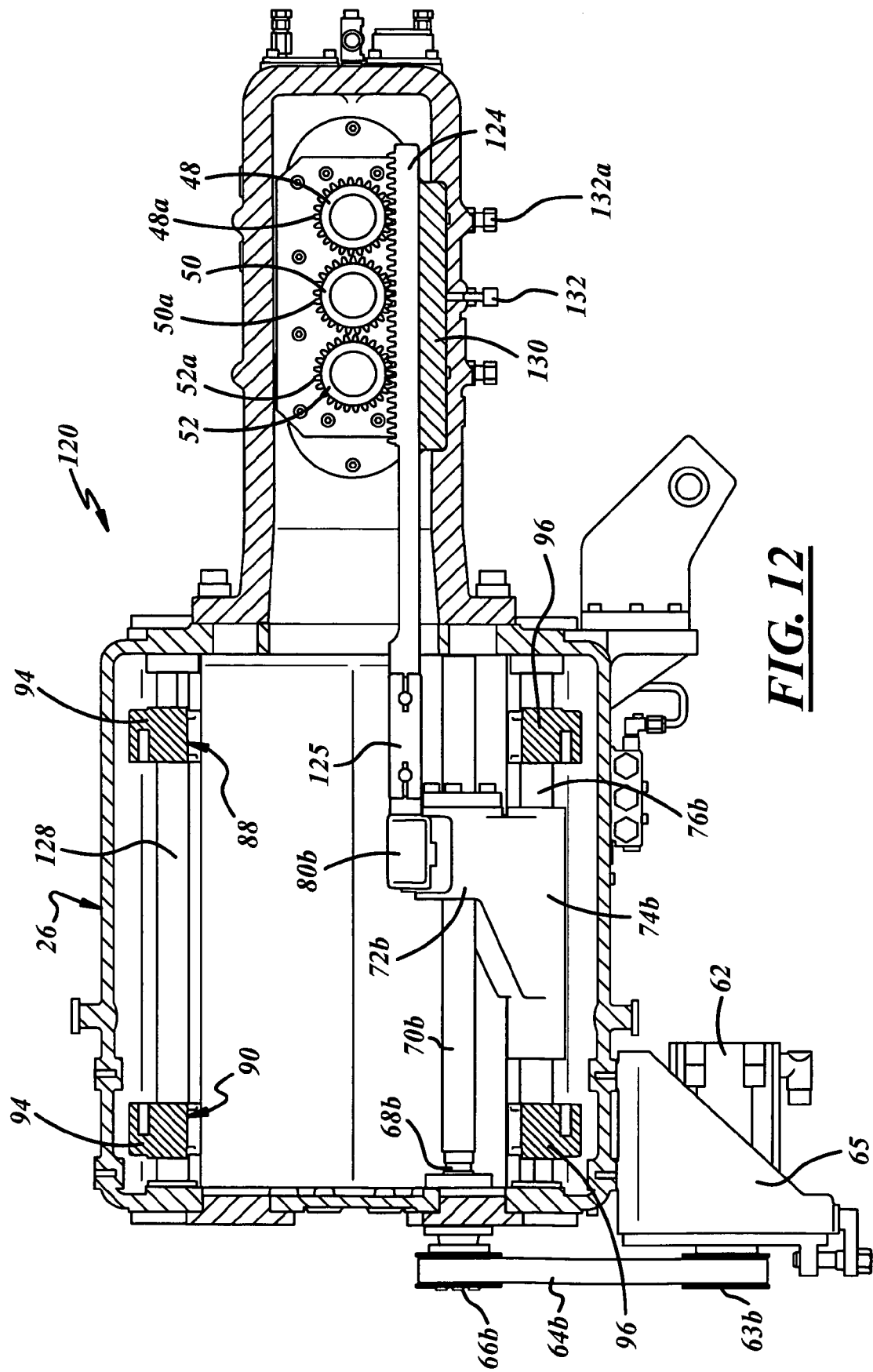
FIG. 12 is a top plan view of the gob distributor in FIG. 11 with portions of the housing removed along.
Figure 13:
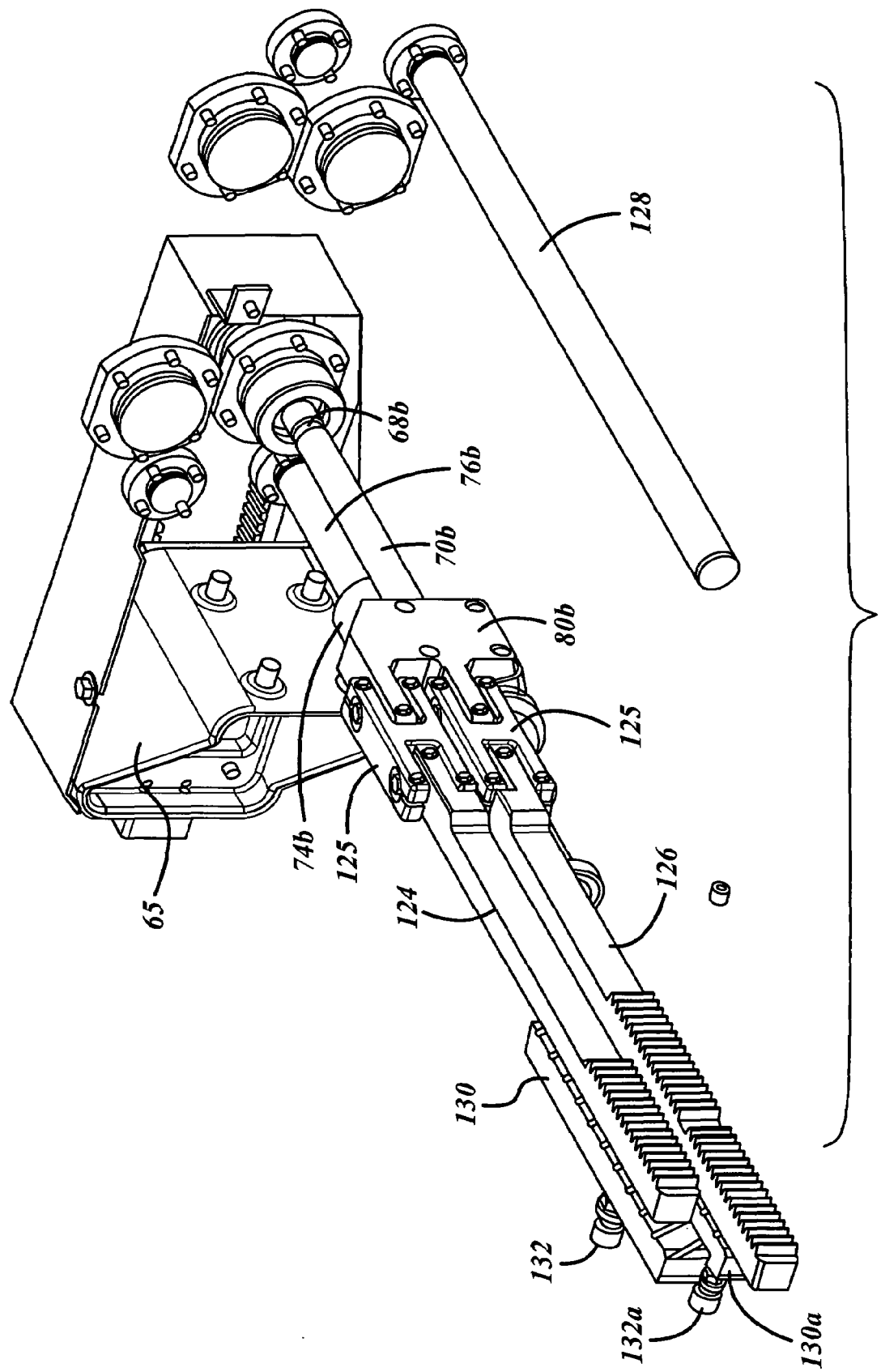
FIGS. 13 and 14 are perspective views similar to those of FIGS. 7 and 8 but illustrating a portion of the gob distributor of FIGS. 11 and 12.
Figure 14:
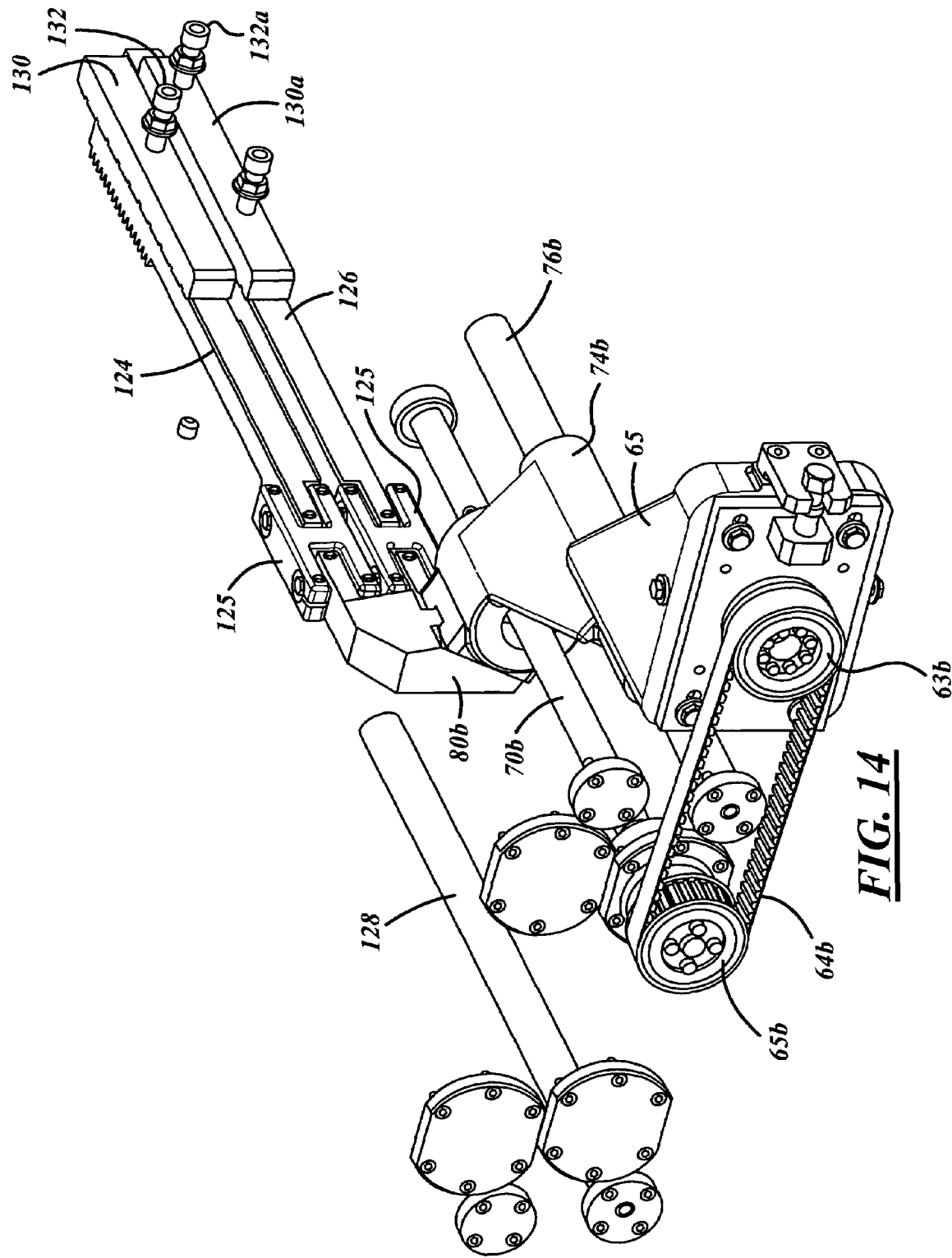

As best seen in FIG. 6, and discussed above, the gear teeth on spindles 48, 50, 52 are at least two different elevations. In the exemplary embodiments, gear teeth 48a, 52a on spindles 48, 52 are at one elevation, and gear teeth 50a on spindle 50 are at a second higher elevation. It will be noted in FIGS. 4, 7 and 8 that drive 85 is on one side of housing 26 and spindles 48, 50, 52, while drives 85a, 85b are on the opposing side. Gear rack 82a of drive 85a is at a higher elevation than rack 82b of drive 85b. Rack 82a is positioned to engage spindle 50, while rack 82b is positioned to engage spindle 48. The teeth 84 on gear rack 82 are such that the gear rack teeth do not engage gear teeth 48a on spindle 48, and teeth 84b on rack 82b are such that these teeth do not engage teeth 52a on spindle 52. Gear racks 82, 82a, 82b are backed up by slide bearings 130, 130a, 130b that are adjustably positionable by means of screws 132, 132a, 132b.

FIGS. 11-14 illustrate a gob distributor 120 in accordance with a second exemplary embodiment of the disclosure. A primary difference between gob distributor 120 in FIGS. 11-14 and gob distributor 20 in FIGS. 1-10 is that all three scoops 42, 44, 46 in gob distributor 120 are driven by a single electric motor 62, preferably an electric servo motor. Reference numerals in FIGS. 11-14 that are identical to reference numerals in FIGS. 1-10 illustrate correspondingly identical or related components. Thus, in gob distributor 120, motor 62 drives shaft 68b and ball screw 70b through pulleys 63b, 66b and drive belt 64b. Ball nut 72b, in a ball-screw/gear-rack drive 123, drives carriage 74b along shaft 76b, and a yoke 125 is coupled to carriage 74b by yoke mounting block 80b. One or more yokes 125 in this embodiment couple carriage 74b to two gear racks, an upper gear rack 124 and a lower gear rack 126. Upper gear rack 124 is engaged with external gear teeth 50a on spindle 50 while lower gear rack 126 is engaged with gear teeth 48a, 52a on respective spindles 48, 52. It is noted that a pair of gear racks 124,126 are preferred because gear teeth 50a on spindle 50 are at a different (higher) elevation than the gear teeth on spindles 48, 52, as is best illustrated in FIG. 6. If differing spindles were used with gear teeth at the same elevation, then only a single gear rack would be needed. Thus, rotation at motor 62 drives gear racks 124, 126 and rotates spindles 48, 50, 52 around their respective axes. Arms 96 of slides 88, 90 are slidable along carriage shaft 76 as in the previous embodiment, while arms 94 of slides 88, 90 are freely slidable along a shaft 128 provided to balance the slides.

As shown in FIG. 6, there is a subassembly that includes housing 26, slides 88, 90, slide shaft 86 and spindles 48, 50, 52 that is common to the two exemplary embodiments of the disclosure. Housing 26 may be provided in two base sections with associated covers as shown. Multiple fittings are shown in the drawings for feeding lubricant and/or coolant to the various components within the housing.

There thus has been disclosed a gob distributor that fully satisfies all of the objects and aims previously set forth. The gob distributor has been disclosed in conjunction with two exemplary embodiments, and a number of additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A glass gob distributor for delivering gobs of molten glass to sections of a glassware forming machine, which includes:
   at least one electric motor,
   a ball screw coupled to said electric motor,
   a carriage slidable on a carriage shaft and coupled to said ball screw,
   at least one gear rack coupled to said carriage,
   at least one scoop coupled to said gear rack for rotation around a scoop axis as a function of linear motion of said gear rack and said carriage,
   a pair of slides slidably mounted on a stationary slide shaft parallel to said carriage shaft on opposite sides of said carriage, said slides being disconnected from said carriage and freely slidable with respect to said carriage and said carriage shaft, and
   a pair of fluid cylinders disposed adjacent to said slides, said fluid cylinders being responsive to an absence of power at said electric motor for pushing said slides toward each other to abut and slidably position said carriage on said carriage shaft, said gear rack and said at least one scoop at a home position.

2. The gob distributor set forth in claim 1 wherein there are at least two of said scoops and at least two of said gear racks respectively coupled to said scoops, both of said gear racks being coupled to said carriage so that said scoops rotate around respective axes as a function of linear motion of said carriage on said carriage shaft.

3. The gob distributor set forth in claim 1 in which there are at least two electric motors, at least two ball screws respectively coupled to said electric motors, at least two carriages slidably disposed on respective carriage shafts and respectively coupled to said ball screws, at least two gear racks respectively coupled to said carriages, at least two scoops respectively coupled to said gear racks for rotation around respective scoop axes as functions of linear motion of associated gear racks and carriages, and wherein said slides are associated with both of said carriages for engaging said carriages on associated carriage shafts and moving said carriages and said scoops to said home positions.

4. The gob distributor set forth in claim 1 wherein said fluid cylinders are connected to each other so as to be actuated simultaneously.

5. The gob distributor set forth in claim 4 wherein said pair of slides are mounted on said slide shaft within a housing as a subassembly adapted for use in a gob distributor having plural scoops coupled by individual gear racks, carriages and ball screws to individual electric motors, and also adapted for use in a gob distributor having plural scoops coupled by one or more gear racks, a single carriage and a single ball screw to a single electric motor.

6. The gob distributor set forth in claim 5 including at least two spindles mounted within said housing for suspending individual associated scoops beneath said housing, said spindles having external gear teeth at differing elevations for connection by associated gear racks to individual carriages or to said single carriage.

7. The gob distributor set forth in claim 1 wherein said at least one electric motor is offset from said ball screw and coupled to said ball screw by a drive belt.

* * * * *